J. C. COLBURN.
DIRECTION INDICATOR OR SIGNAL FOR MOTOR VEHICLES AND THE LIKE.
APPLICATION FILED JAN. 14, 1919.

1,375,628.

Patented Apr. 19, 1921.
2 SHEETS—SHEET 1.

Inventor
J.C. Colburn,

Witnesses
J. H. Crawford
J. J. McCarthy

By Victor J. Evans
Attorney

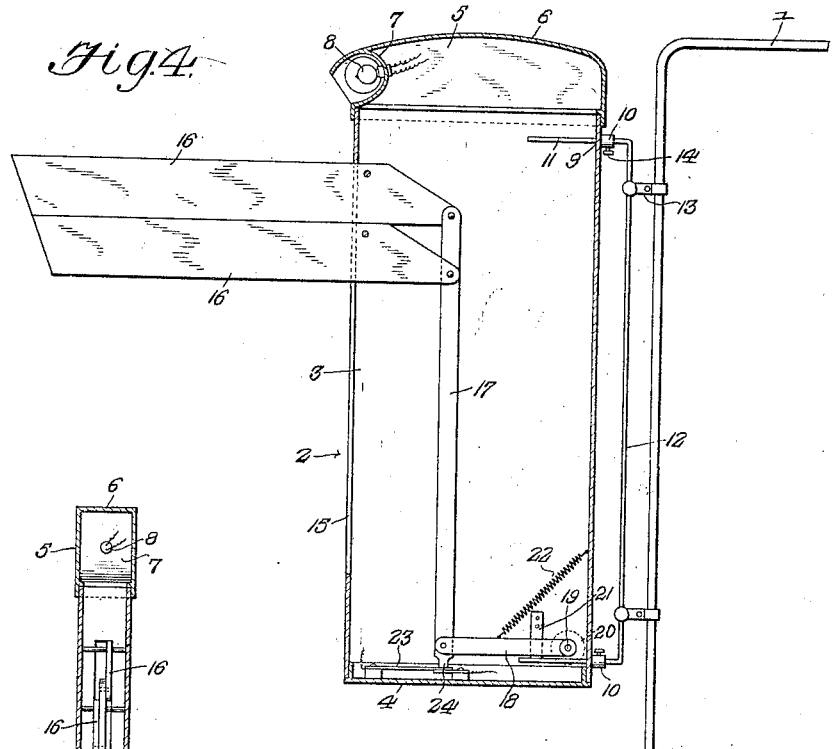
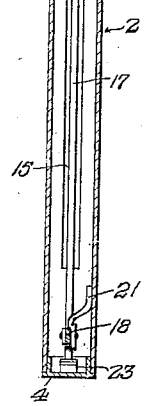
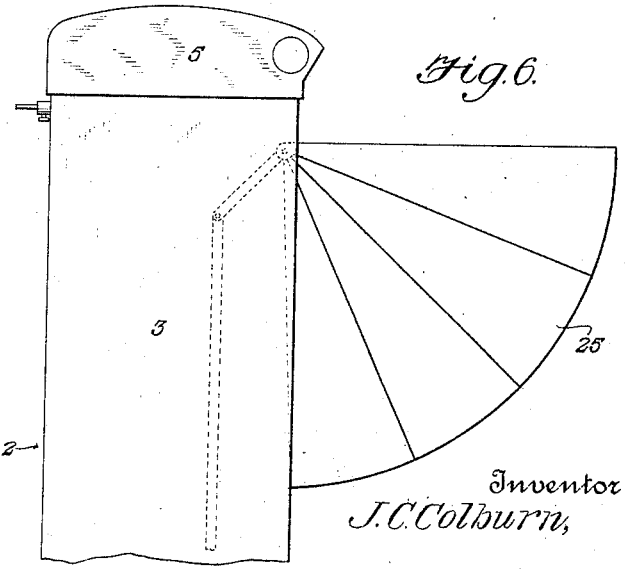

UNITED STATES PATENT OFFICE.

JAY C. COLBURN, OF WEBSTER CITY, IOWA.

DIRECTION INDICATOR OR SIGNAL FOR MOTOR-VEHICLES AND THE LIKE.

1,375,628.     Specification of Letters Patent.     Patented Apr. 19, 1921.

Application filed January 14, 1919. Serial No. 271,023.

*To all whom it may concern:*

Be it known that I, JAY C. COLBURN, a citizen of the United States, residing at Webster City, in the county of Hamilton and State of Iowa, have invented new and useful Improvements in Direction Indicators or Signals for Motor-Vehicles and the like, of which the following is a specification.

This invention relates to improvements in direction indicating devices for motor vehicles and has particular application to a device which may be carried by the wind shield of a vehicle. It will be understood however that the indicator may be attached to any part of the vehicle within reach of the operator and my invention is applicable to any vehicle.

In carrying out the present invention, it is my purpose to provide a direction indicating device for motor vehicles whereby the operator of the vehicle may indicate to the operators of other vehicles and to pedestrians the direction to which he is about to steer his machine, thereby enabling such pedestrians and operators of other vehicles to govern themselves accordingly.

It is also my purpose to provide direction indicating devices of the class described which may be readily and conveniently attached to the wind shield of the vehicle, which may be easily adjusted upon the wind shield so as to be plainly observable from the rear of the vehicle and which will embody comparatively few parts and these so arranged and correlated as to reduce the possibility of derangement to a minimum.

A further object of my invention is the provision of a direction indicating apparatus for motor vehicles which may be illuminated at night so as to render the device visible, and furthermore my improved direction indicator or signal embraces the desired features of simplicity, efficiency and durability and may be manufactured and marketed at small cost.

With the above recited objects in view and others of a similar nature, the invention resides in the construction, combination and arrangement of parts set forth in and falling within the scope of the appended claim.

In the accompanying drawings:—

Fig. 3 is a vertical sectional view through the same.

Fig. 4 is a similar view taken at right angles to Fig. 3.

Fig. 6 is a view in elevation showing the modified form of the invention.

Figure 1:
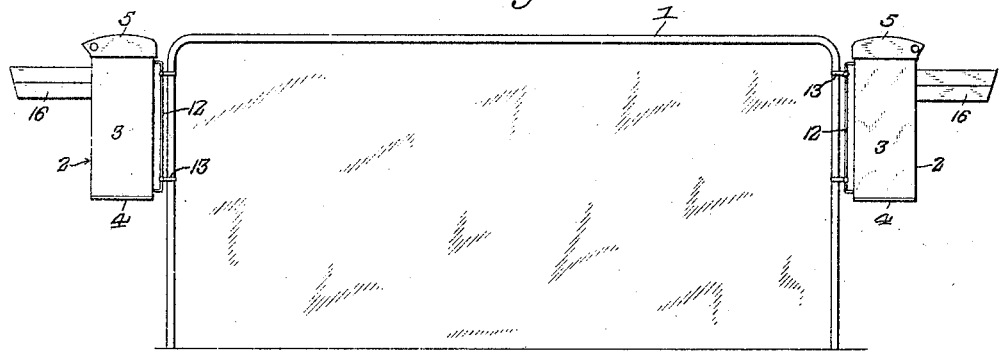
Figure 1 is a fragmentary front elevation of the motor vehicle equipped with the direction indicating signal constructed in accordance with my present invention.
Figure 2:
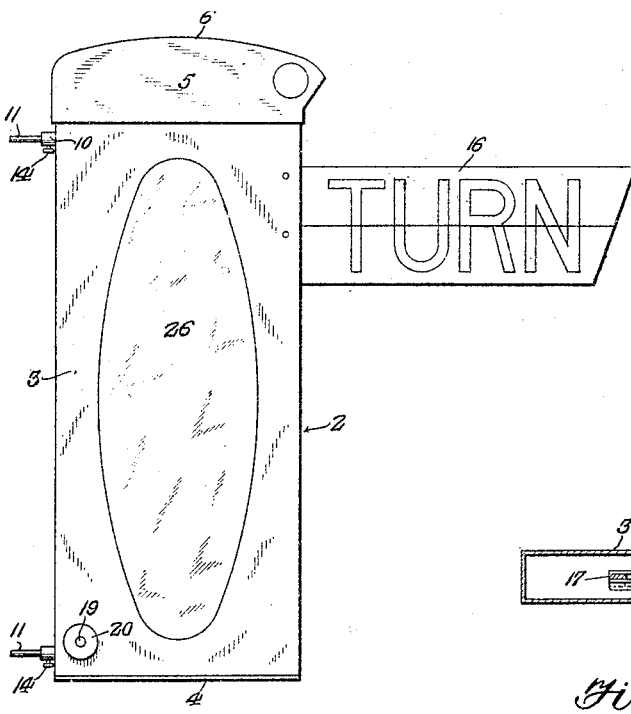
Fig. 2 is a rear elevation of one of the signal devices.
Figure 5:
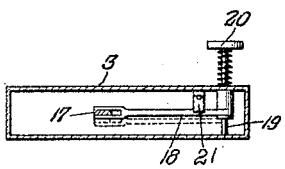
Fig. 5 is a horizontal cross sectional view through one of the signal devices.

Referring now to the drawings in detail 1 designates the wind shield of a motor vehicle, while 2—2 indicates signaling devices constructed in accordance with my present invention and arranged at the opposite sides of the windshield 1.

Each signal device 2 embodies a vertical casing 3 substantially rectangular in cross section and provided with a removable bottom wall 4 and a removable top wall 5. The top wall 5 carries a hood 6 and one end of the hood 6 is spaced apart from the adjacent end of the top wall 5 and disposed in such space is a reflector 7 carrying an electric bulb 8.

Formed in one end of the casing 3 adjacent to the top and bottom walls thereof are openings 9 and formed on the outer side of such end walls contiguous to the openings 9 are bosses 10 formed with openings alining with the openings 9 in the end walls. Passed through these openings are horizontal rods 11 that extend into the casing and parallel with the top and bottom walls thereof. The outer end of the rods 11 are interconnected by means of a vertical rod 12 that parallels the adjacent end wall of the case and secured to the vertical rod 12 are brackets 13. These brackets 13 are appropriately spaced apart along the rods 12 and are adapted for connection with the adjacent side edge of the wind shield frame in order to support the casing 3 upon the wind shield. Brackets 13 may be of any suitable or approved construction so as to insure a positive and effectual connection between the casing 3 and the frame of the wind-shield. The bosses are equipped with set screws 14 by means of which the horizontal rods 11 may be locked to the casing 3. By means of these rods and set screws the casing 3 may be adjusted toward and away from the adjacent edge of the wind-shield in order to render the casing visible in the rear of the vehicle equipped with my improved signaling apparatus.

The outer end wall of the case 3 is formed with a vertical slot 15 and pivoted within the slot 15 adjacent to the upper end of the latter are blades 16 pivoted to the respective side walls of the slot and arranged one above the other so that when the blades are swung to a position at right angles to the casing 3 so as to project beyond the slot 15, such blades will lie in superimposed relation in order to provide, in effect, a signal semaphore arm bearing the word "Turn" or some other direction indicating marks. Owing to the mounting of the blades constituting the semaphore arm, such blades lie side by side swung to a vertical position and into the slot 15. Thus the blade, when swung to inactive position requires comparatively small space thereby enabling the size of the casing to be reduced to a minimum so that the signal devices at the opposite sides of the wind shield will be neat and ornamental in appearance.

The inner end of the blades 16 constituting the semaphore arm are connected with suitable operating mechanism. In the present instance this mechanism embodies a vertical rod 17 that is pivotally connected with the inner ends of the blades 16. The lower end of the rod 17 is pivotally secured to one end of a horizontal arm 18 and the other end of the arm 18 is fixed to a rock shaft 19 journaled in the front and back walls of the casing 3 adjacent to the bottom thereof and provided, at one end, with a knob or handle 20 whereby the rock shaft may be rotated to impart movement to the arm 18 and rod 17 to swing the blades 16 to semaphore forming position.

21 designates an appropriate form of catch or latch that engages the arm 18 when the latter is actuated to swing the blade 16 to active position and when the arm 18 is engaged by the catch 21 such arm and the signal blade are held in active position. The retractile spring 22, in the present instance has one end secured to the arm 18 and the other end fastened to one wall of the casing 3. This spring 22 is placed under tension when the arm 18 is swung to active position so that when such arm is relieved of the influence of the catch 21 the spring may re-act to restore the parts to inactive position.

In order that the parts may be restored to inactive or normal position as just described, the shaft 19 is capable of longitudinal movement within its bearings and when the shaft is shifted longitudinally the arm 18 is moved away from the catch or latch 21 thereby permitting the spring 22 to react as described.

An appropriate form of electrical switch 23 is secured to the bottom wall 4 of the casing 3 and this switch is of the normally open type and is connected in circuit with the bulb 8 and a source of electrical energy. The movable element of the switch 23 is disposed in line with a heel 24 on the lower end of the rod 17 so that when the rod 17 is swung downwardly under the action of the arm 18 such heel will engage the switch 23 and operate the latter to closed position so that the lamp or bulb 8 will be energized to illuminate the indicator. A second hand operated switch is preferably connected in the light circuit so that such circuit may be broken during daylight in order to prevent waste of current in the operation of the indicator.

It is understood, of course, that the signal devices at the opposite sides of the windshield are identical in construction and operation. Therefore the operator of the signal equipped vehicle may indicate to the operators of other vehicles and to pedestrians the direction in which he is about to steer his vehicle.

While I have herein shown and described one particular form of my invention by way of illustration, I wish it to be understood that I do not limit or confine myself to the precise details of construction herein described and delineated, that modification and variations may be made within the scope of the claim and without departing from the spirit of the invention. For instance, the semaphore arm may be constructed of a plurality of band like sections 25, as shown in Fig. 6 of the drawing, while the shaft 19 may be operated by other means, in lieu of the hand knob shown.

The rear side of each vertical casing 3 is equipped with a mirror or reflector 26 to assist the driver of the vehicle.

I claim:—

In a device of the class described, a casing having a vertical slot in one wall thereof, a signal arm pivoted within said casing and adapted to be moved through said slot, a vertically disposed rod with which one end of the arm is pivotally connected, a rock shaft journaled within the casing, a link connecting the shaft with the lower extremity of said rod, whereby said blade may be projected from the casing when said rod is lowered, a latch element projecting from one side of the casing and disposed adjacent the length, and designed to engage the latter to hold the arm projected, said rock shaft projecting an appreciable distance beyond one wall of the casing, said shaft being susceptible of horizontal sliding adjustment, a coil spring surrounding said projected portion of the shaft having one end bearing against the casing, a knob on one end of the shaft to engage with the spring, whereby the spring holds said shaft in a position whereby the latch engages the link, said shaft adapted to be moved against the tension of the spring to separate the link from the latch, and a spring connecting the link and one wall of the casing whereby the parts are automatically returned to normal position when released from the latch.

In testimony whereof I affix my signature.

JAY C. COLBURN.